(12) United States Patent
Severino et al.

(10) Patent No.: US 11,494,092 B2
(45) Date of Patent: Nov. 8, 2022

(54) ADDRESS SPACE ACCESS CONTROL

(71) Applicant: Arm Limited, Cambridge (GB)

(72) Inventors: Christopher Vincent Severino, Haverhill (GB); Seow Chuan Lim, Letchworth Garden City (GB); Aris Doros Aristodemou, Saffron Walden (GB); Matthew Lucien Evans, Cambridge (GB)

(73) Assignee: Arm Limited, Cambridge (GB)

( * ) Notice: Subject to any disclaimer, the term of this patent is extended or adjusted under 35 U.S.C. 154(b) by 421 days.

(21) Appl. No.: 16/170,371

(22) Filed: Oct. 25, 2018

(65) Prior Publication Data

US 2019/0146693 A1 May 16, 2019

(30) Foreign Application Priority Data

Nov. 13, 2017 (GB) ...................................... 1718712

(51) Int. Cl.
*G06F 3/06* (2006.01)
*G06F 12/14* (2006.01)

(52) U.S. Cl.
CPC .......... *G06F 3/0622* (2013.01); *G06F 3/0646* (2013.01); *G06F 3/0673* (2013.01); *G06F 12/1458* (2013.01); *G06F 2212/271* (2013.01)

(58) Field of Classification Search
CPC ............................................... G06F 2221/0737
See application file for complete search history.

(56) References Cited

U.S. PATENT DOCUMENTS

| 7,406,573 | B2 * | 7/2008 | Huppenthal | ........ G06F 15/7867 |
| | | | | 326/41 |
| 2012/0185667 | A1 | 7/2012 | Gandhi | |
| 2014/0208003 | A1 | 7/2014 | Cohen | |
| 2016/0048327 | A1 * | 2/2016 | Jayasena | ............. G06F 13/1647 |
| | | | | 711/112 |
| 2016/0364142 | A1 | 12/2016 | Kanno | |
| 2017/0147499 | A1 * | 5/2017 | Mohan | .................. G06F 3/0616 |

FOREIGN PATENT DOCUMENTS

GB          2 302 604          1/1997

OTHER PUBLICATIONS

Combined Search and Examination Report for GB1718712.1, dated May 8, 2018, 7 pages.
Robert Bedichek, "Some Efficient Architecture Simulation Techniques", Winter 1990 USENIX Conference, 12 pages.

* cited by examiner

*Primary Examiner* — Henry Tsai
*Assistant Examiner* — Juanita Borromeo
(74) *Attorney, Agent, or Firm* — Nixon & Vanderhye P.C.

(57) ABSTRACT

There is provided an apparatus for receiving a request from a master to access an input address. Coarse grain access circuitry stores and provides a reference to an area of an output address space in dependence on the input address. One or more fine grain access circuits, each store and provide a reference to a sub-area in the area of the output address space in dependence on the input address. The apparatus forwards the request from the coarse grain access circuitry to one of the one fine grain access circuits in dependence on the input address.

20 Claims, 10 Drawing Sheets ered by reference.
The present technique relates to memory as could be used in, for instance, a data processing apparatus.

In a data processing apparatus an address space, which can be virtual and/or provide access permissions, is often provided in order to provide access to particular slave components such as memory (e.g. DRAM) or peripherals (e.g. WIFI or display controllers). However, in systems where there is a large address space (which could be required for compatibility with other systems) and a small memory, data relating to access control of this address space could occupy a large portion of memory. This is especially true if there are multiple masters accessing the address space, since different permissions could apply to each combination of master and slave. It is, however undesirable to expend large amounts of memory on storing such data. One solution to this problem is to move memory management into software. However, this can significantly increase latency—particularly where multiple memory accesses occur.

Viewed from a first example configuration, there is provided an apparatus adapted to receive a request from a master to access an input address, the apparatus comprising: coarse grain access circuitry to store and provide a reference to an area of an output address space in dependence on the input address; and one or more fine grain access circuits, each to store and provide a reference to a sub-area in the area of the output address space in dependence on the input address, wherein the apparatus is adapted to forward the request from the coarse grain access circuitry to one of the one fine grain access circuits in dependence on the input address.

Viewed from a second example configuration, there is provided a method comprising: receiving a request from a master to access an input address; providing, at coarse grain access circuitry, a reference to an area of an output address space in dependence on the input address; forwarding the request from the coarse grain access circuitry to a fine grain access circuit in dependence on the input address; and providing, at the fine grain access circuitry, a reference to a sub-area in the area of the output address space in dependence on the input address.

Viewed from a third example configuration, there is provided a computer program for controlling a host data processing apparatus to provide an instruction execution environment comprising: receiver program logic adapted to receive a request from a master to access an input address; coarse grain access program logic adapted to store and provide a reference to an area of an output address data structure in dependence on the input address; and fine grain access program logic adapted to store and provide a reference to a sub-area in the area of the output address data structure in dependence on the input address, wherein the apparatus is adapted to forward the request from the coarse grain access program logic to part of the fine grain access program logic in dependence on the input address.

The present technique will be described further, by way of example only, with reference to embodiments thereof as illustrated in the accompanying drawings, in which.

Figure 3A:
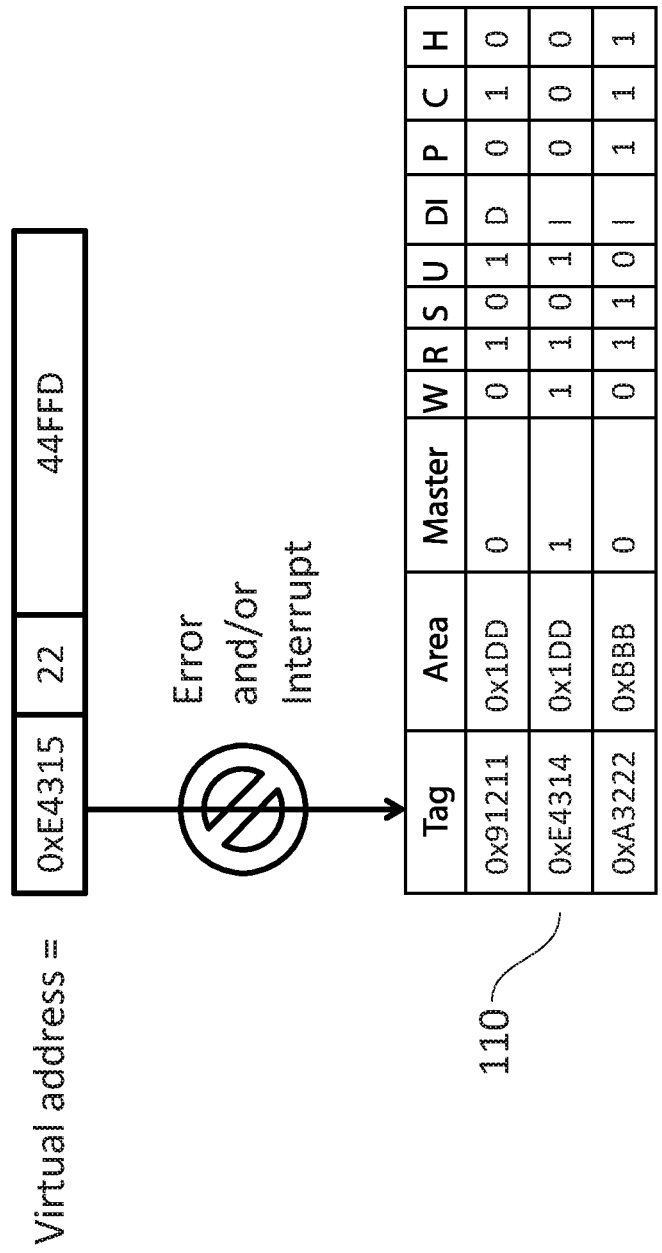
Figure 3B:
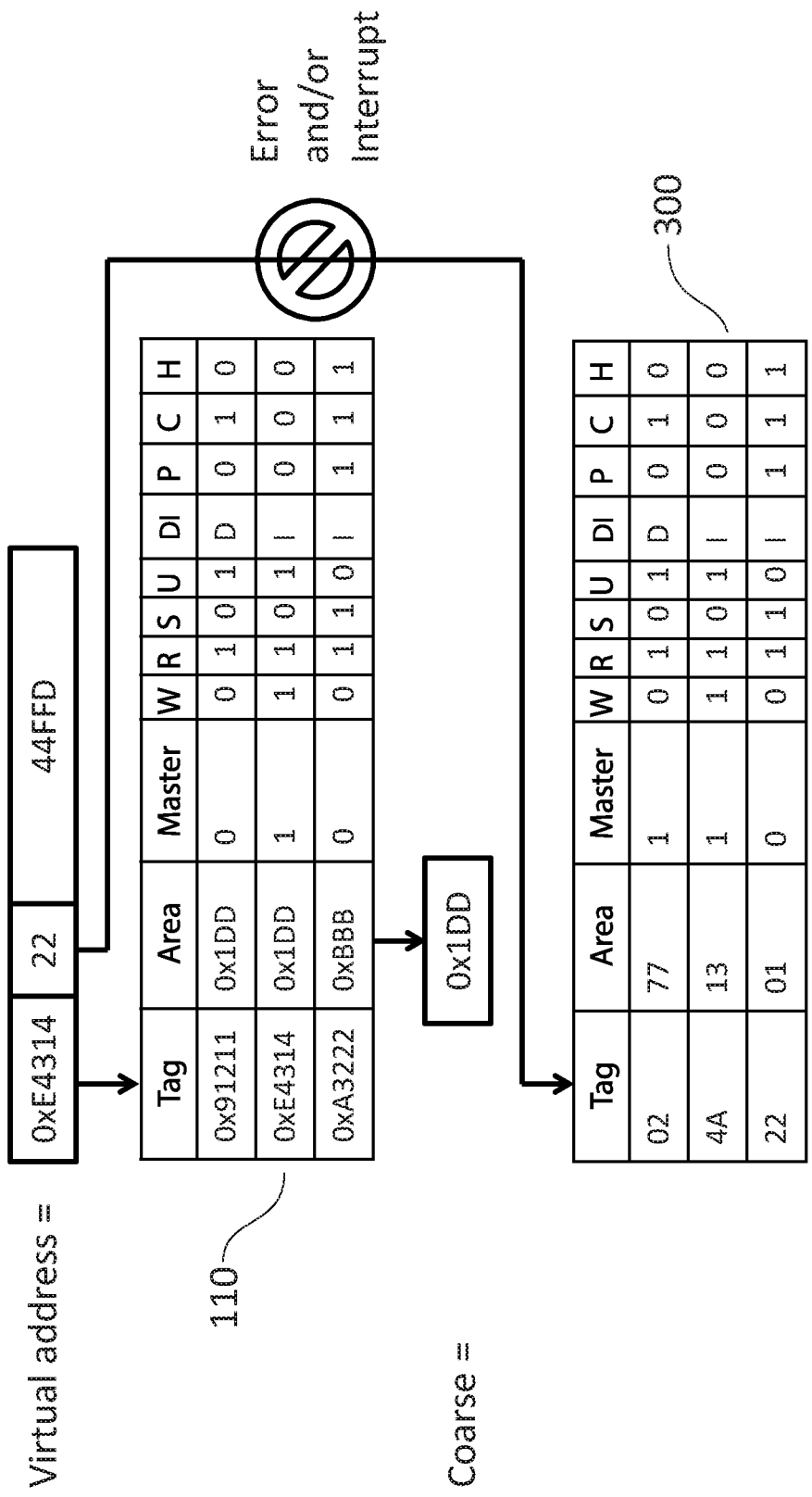
Figure 4:
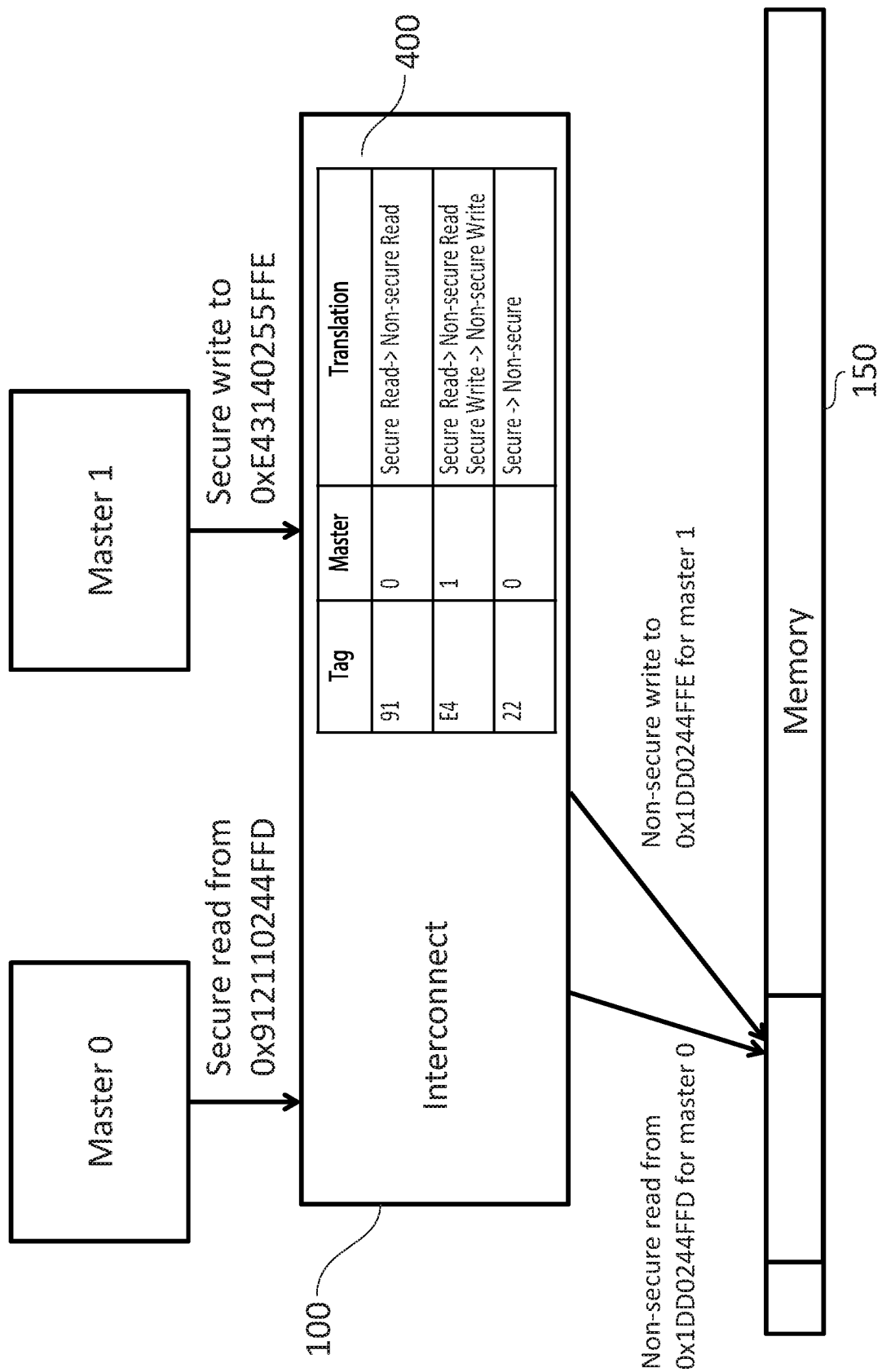
Figure 5:
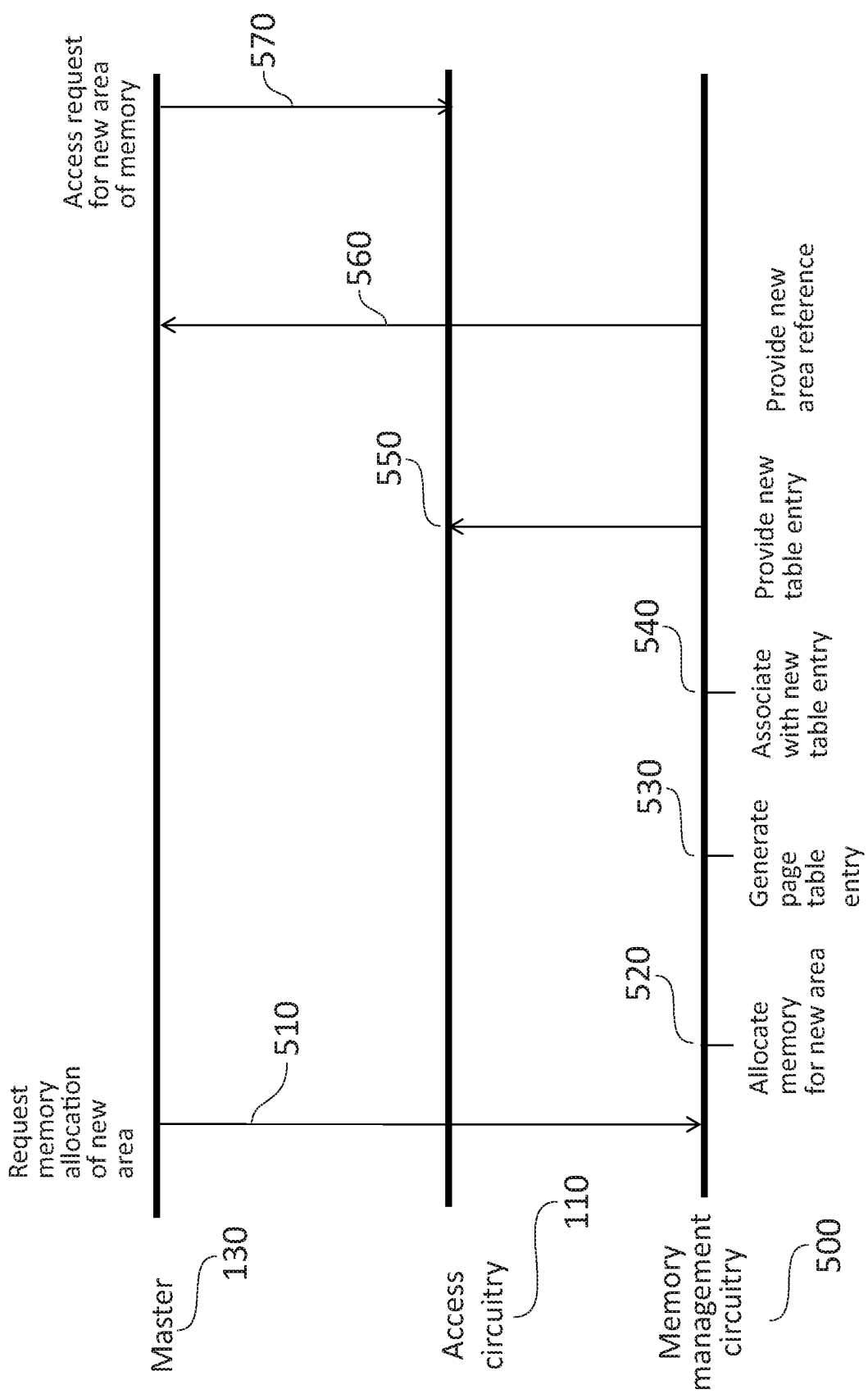
Figure 6:
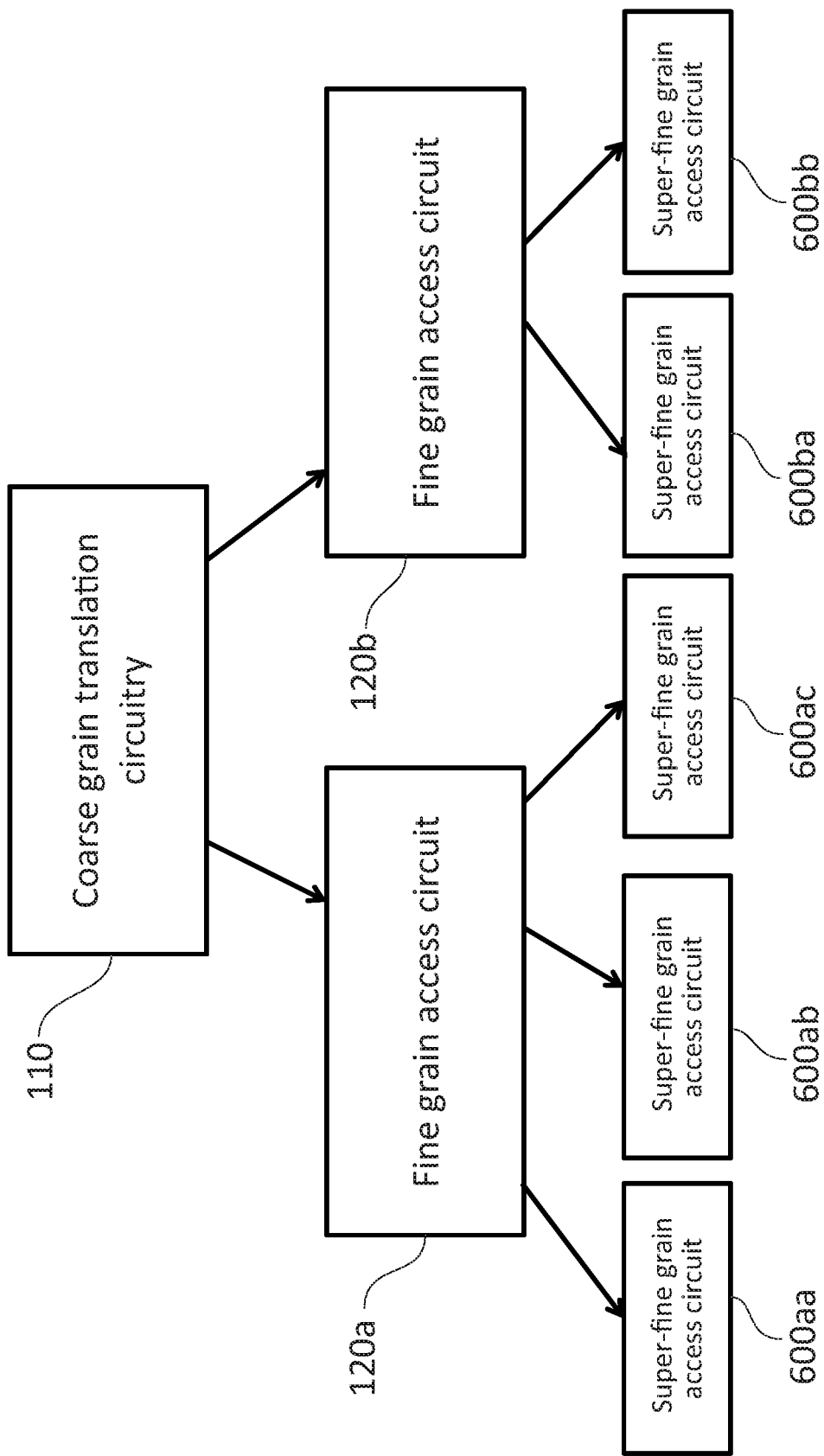
Figure 7:
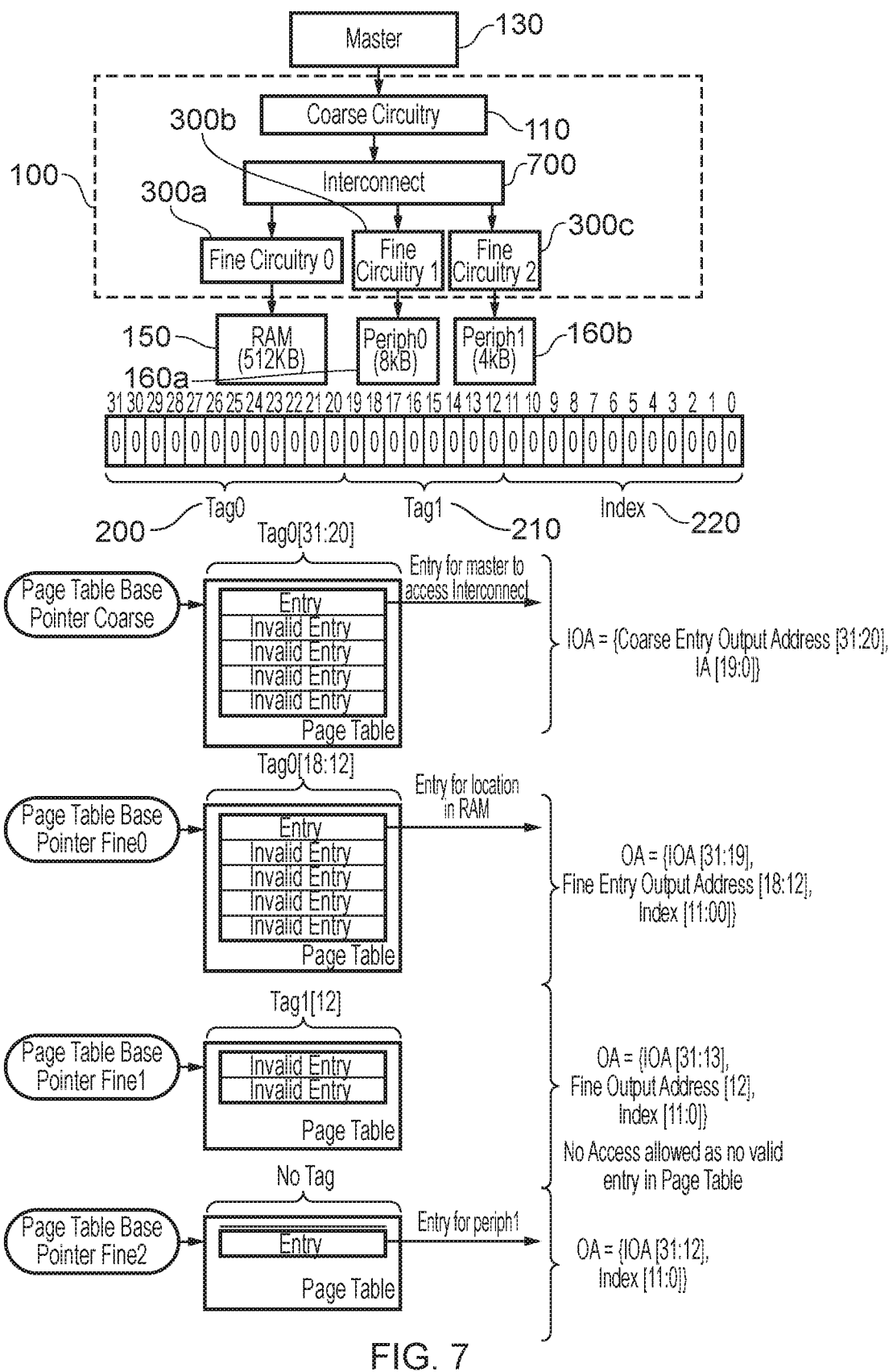
Figure 8:
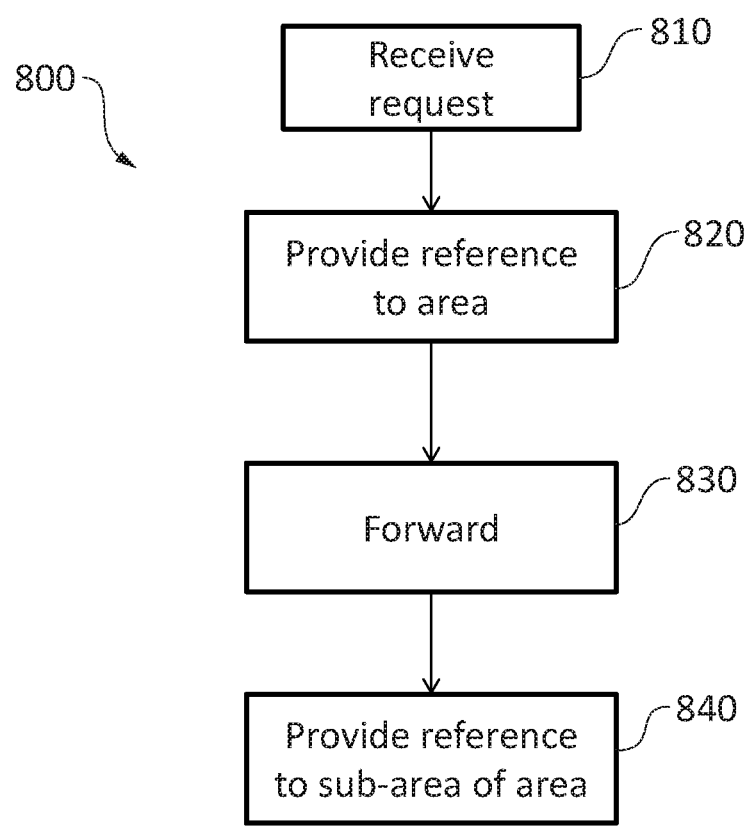
Figure 9:
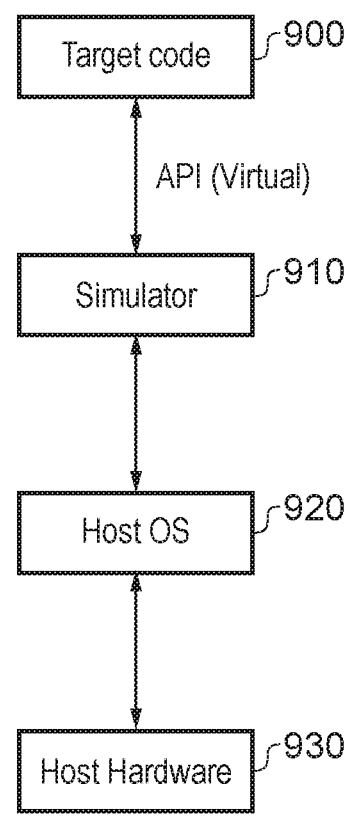

FIG. 3A indicates the behaviour of the apparatus when an invalid access is received by the coarse grain access circuitry in accordance with some examples;

FIG. 3B illustrates the behaviour of the apparatus when an invalid access is received by the fine grain access circuitry in accordance with some examples;

FIG. 4 schematically illustrates a change in permissions occurring during an access in accordance with some examples;

FIG. 5 shows an exchange of information between circuits when a new memory region is requested by a master in accordance with some examples;

FIG. 6 illustrates how the circuitry can be extended to a hierarchy of a number of levels in accordance with some examples;

FIG. 7 illustrates a schematic of the apparatus in accordance with some examples;

FIG. 8 illustrates a flow chart showing a method in accordance with some examples; and FIG. 9 illustrates a schematic of how the present technique can be implemented in a simulation environment in accordance with some examples;

Before discussing the embodiments with reference to the accompanying figures, the following description of embodiments and associated advantages is provided.

In accordance with one example configuration there is provided an apparatus adapted to receive a request from a master to access an input address, the apparatus comprising: coarse grain access circuitry to store and provide a reference to an area of an output address space in dependence on the input address; and one or more fine grain access circuits, each to store and provide a reference to a sub-area in the area of the output address space in dependence on the input address, wherein the apparatus is adapted to forward the request from the coarse grain access circuitry to one of the one or more fine grain access circuits in dependence on the input address.

When a master wishes to access part of an address space, the master will issue an access request to an interconnect, the request including an input address. The input address will point to a particular location within the address space that the master wishes to access. The interconnect must forward the request to the relevant device. For example, if the input address relates to an address in a memory, the request must be passed to a memory controller in order to access the memory at the desires location. During this process, the address could be translated one or more times, e.g. from an input address to an output address. For example, the input address may be a virtual address, which is part of a large input address space, and is mappable to a smaller physical address space. Such techniques can be used in order to enable direct memory mapping to devices, as well as providing each devices or application its own view of a memory system, which may appear much larger than the true physical memory system. In accordance with the above, coarse grain access circuitry receives the access comprising the input address, and in turn provides a reference to an area of an output address space. The output address space could be a physical address space or could be an intermediate address space, which could be translated to a further output address space. The reference to the area of the output address space is provided in dependence on the input address. Having determined the area, the request is then forwarded to one of several fine grain access circuits. The fine grain access circuit to which the request is forwarded is dependent on the input address (of course, since the area is also dependent on the input address, the fine grain access circuit to which the request is forwarded could also be said to be dependent on the output address). Having been received by the fine grain access circuit, a reference to a sub-area of an area of the output address space is provided. The reference to the sub-area is again dependent on the input address. In this manner, the coarse grain access circuitry narrows down the area of the output address space based on the input address, and the fine grain access circuit further narrows down the area of the output address space that is being referred to. Entries in the coarse grain access circuitry therefore refer to large areas of memory. The number of entries required by the coarse grain access circuitry can therefore be reduced as compared to a situation where each area of memory being referred to was much smaller. This does not result in an overall loss in granularity since the fine grain access circuits can be used in order to provide fine grain references. However, since each of the fine grain access circuits is responsible for sub-dividing its own area, the fine grain access circuits do not need to consider the possibility that an input address will refer to somewhere outside its assigned area. Consequently, the number of entries that are stored at each fine grain access circuit can be reduced and so the memory required in order to store each of the entries at each of the access circuits can also be reduced. In addition, since the entries at the coarse grain access circuitry are large, the probability of a miss occurring can be vastly reduced as compared to a situation where each of the entries is much smaller, more entries are required, and therefore it is less likely that the limited capacity of the coarse grain access circuitry contains the specific entry that is required for the incoming input address. As a consequence of fewer misses occurring, the efficiency of the system can be improved by virtue of fewer page walks occurring. Note that in some embodiments, the access circuitry could be translation circuitry, which performs access control as well as translation. In such embodiments, the access circuitry merely determines whether the master is permitted to access the requested area of memory. Hence, the input address and the output address could be the same. The present technique applies equally to such scenarios, since the number of entries can still be reduced as a consequence of the two-level structure provided by coarse and fine grain access circuits.

In some examples, in response to the coarse grain access circuitry lacking an entry corresponding with the input address, the coarse grain access circuitry is adapted to do at least one of the following: raise an error, and raise an interrupt. Similarly, in some examples, in response to the fine grain access circuits lacking an entry corresponding with the input address, the fine grain access circuitry is adapted to do at least one of the following: raise an error, and raise an interrupt. In each case, there is no need for the access circuitry to store invalid entries. In particular, if there is no mapping, or if no access is permitted for the requesting master, then it is not necessary to provide an entry at the coarse grain access circuitry/fine grain access circuit(s) in relation to that combination of address and master. Instead, it can be assumed that if no entry exists, access is denied. Attempting to make such access can therefore result in the raising of an error and/or the raising of an interrupt. By not storing invalid entries, the number of entries required at the coarse grain access circuitry/the fine grain access circuit(s) can be reduced. This can result in faster lookups at each circuit and also reduces the memory requirements for storing the entries themselves.

In some examples, the master is one of a plurality of masters; the apparatus is adapted to receive the request from any of the plurality of masters; and each reference stored by the coarse grain access circuitry and each of the one or more fine grain access circuits is associated with one of the plurality of masters. Each master could utilise a different address space, which ultimately maps into the same output address space. In this way, the address space used by one master may enable access to a resource that other masters do not have access to. This can be used to provide the illusion that each master has its own dedicated address space, even though the underlying resources could be shared between multiple masters. It will be appreciated of course that there may be multiple coarse grain access circuitries and each one can be associated with multiple masters, as necessary.

In some examples, the coarse grain access circuitry is adapted to provide the reference to the area of the output address space in further dependence on the master. Hence, the coarse grain access circuitry may only provide the reference to the area if the master and the input address both match a relevant entry stored at the coarse grain access circuitry. For example, even if an ineligible master provides an input address that, for another master, would point to a particular area of memory, the request issued by the ineligible master will not be honoured. In other words, no entry will be located, and as such an error and/or interrupt will be raised as previously discussed.

In some examples, each of the one or more fine grain access circuits is adapted to provide the reference to the sub-area in further dependence on the master. Similarly, the above access denial could be implemented at a fine grain access circuit. For instance, a first master and a second master may each have access to a common memory, an entry for which is provided at the coarse grain access circuitry for both masters. However, if part of that common memory is reserved for one of the masters, then an attempt by the other master to access that restricted area of memory (e.g. by providing the address used by the eligible master) would not succeed. Again, this would result in an error and/or an interrupt being raised by the fine grain access circuit.

In some examples, the coarse grain access circuitry is adapted to provide different references for at least a subset of the plurality of masters in respect of the same input address. Hence, in these examples, even if different masters provide the same input address, then it is possible that those masters will be provided with references to different sub-areas. This can therefore be used in order to maintain the illusion that the address space seen by each master is unique and does not contain areas of memory that are allocated to other devices.

In some examples, one or more fine grain access circuits is adapted to provide different sub-areas for at least a subset of the plurality of masters in respect of the same input address. Hence, even if the same input address is provided to one of the fine grain access circuits by different masters that address could point to different sub-areas. Consequently, this could be used to maintain the illusion that the address space used by each master is unique to that master and does not contain access to areas that are inaccessible by that master.

In some examples, a size of the sub-area is at most a size of the area. The sub-area could therefore be the same as the area. The fine grain access circuit(s) can therefore further refine the input address such that eventually the input address can be mapped to a specific output address.

In some examples, there is provided allocation circuitry to generate a new entry, associate a new area of the output address space with the new entry, and provide the new entry to the coarse grain access circuitry before a request to access the new area is received. Furthermore, in some examples, there is provided allocation circuitry to generate a new entry, associate a new area of the output address space with the new entry, and provide the new entry to one of the one or more fine grain access circuits before a request to access the new area is received. In either case, this makes it possible for the coarse grain access circuitry or the fine grain circuit to be populated with an entry relating to a newly allocated area of memory before a request to access that new area is received. This reduces the need for the request to access the new area to cause a page walk to occur in order for the relevant entry to be inserted into the coarse grain access circuitry/fine grain access circuit. Since the present technique enables the coarse grain circuitry and the fine grain circuits to store fewer entries, it is less likely that a newly stored entry will be evicted before it is requested. Hence, adding such an entry when a memory location is allocated is more likely to forgo the need for a future page walk to take place.

In some examples, the input address is a virtual address or an intermediate physical address. An intermediate physical address is one that has been partly translated. For instance, the intermediate physical address may refer to an intermediate address space, which is neither the physical address space nor the virtual address space used by the master.

In some examples, a size of the area is greater than 64 kB. A page is the smallest unit of memory that is managed by the hardware. For example, if the page size is 64 kB, then it is possible for two areas of memory each of 64 kB to be allocated to different masters. However, it would not be possible for one 64 kB area of memory to be split in half and be allocated to two masters. Modern operating systems tend to operate on a page size of 4 kB, 16 kB, or 64 kB. In the present examples, the size of the area managed by the coarse grain access circuitry is greater than this.

In some examples, the apparatus comprises: a hierarchy of access circuits, comprising a plurality of n levels; a first of the n levels comprising the coarse grain access circuitry; a second of the n levels comprising the one or more fine grain access circuits, wherein a size of the area referenced by circuitry at each level decreases as level increases. Increasing the height of the hierarchy beyond two levels (coarse and fine) allows for greater flexibility in allocating the output address space to different devices. By adding more levels (e.g. increasing the height), the granularity can be made smaller. At the same time, there can be more common regions, which can be larger at the higher levels.

In some examples, the request comprises a requested access type; at least one of the coarse grain access circuitry and the one or more fine grain access circuits is adapted to store the reference with one or more associated properties and to provide the reference in further dependence on the requested access type and the one or more associated properties. The access type relates to a manner in which the master wishes to access the information stored at the input address. This manner of access maybe restricted by one or more of the coarse grain circuitry and/or the one or more fine grain access circuits. In particular, in some examples, the properties include one or more of: whether read access is permitted, whether write access is permitted, whether secure access is permitted, whether non-secure access is permitted, whether data access is permitted, whether instruction access is permitted, whether privileged access is permitted, whether unprivileged access is permitted, whether the access is cacheable, whether the access is uncacheable, whether the access is shareable, and whether the access is unsharable. Access to the requested input address can therefore be restricted based on what is permitted and based on what the master wishes to do at that input address. Where there is a conflict, there are a number of actions that can be taken. In particular, in some examples, the conflict can result in an interrupt and/or an error condition being raised.

In some examples, at least one of the coarse grain access circuitry and the fine grain access circuits modifies the requested access type in dependence on the requested access type and on one or more access translations. Accordingly, in these examples, where there is a conflict between the desired access type and the permitted access type in respect of an input address, it may be possible to translate the access type to one that is permitted. For example, if a secure access is requested, and it is determined that it is possible for a non-secure access to have been made and further, the value of the data to be accessed depends on the security of the transaction alongside the address of the transaction and the master which issues the secure transaction wishes to access the non-secure version of the address, then it is possible to translate the secure request to a non-secure request, thereby allowing the master which issued the secure transaction access to the non-secure version of the address.

In some examples, at least one of the coarse grain access circuitry and fine grain access circuits is translation circuitry. Such translation circuitry translates at least some bits of the input address to provide at least some bits of the output address—the input address and output address being different in at least some instances.

Particular embodiments will now be described with reference to the figures.

Figure 1:
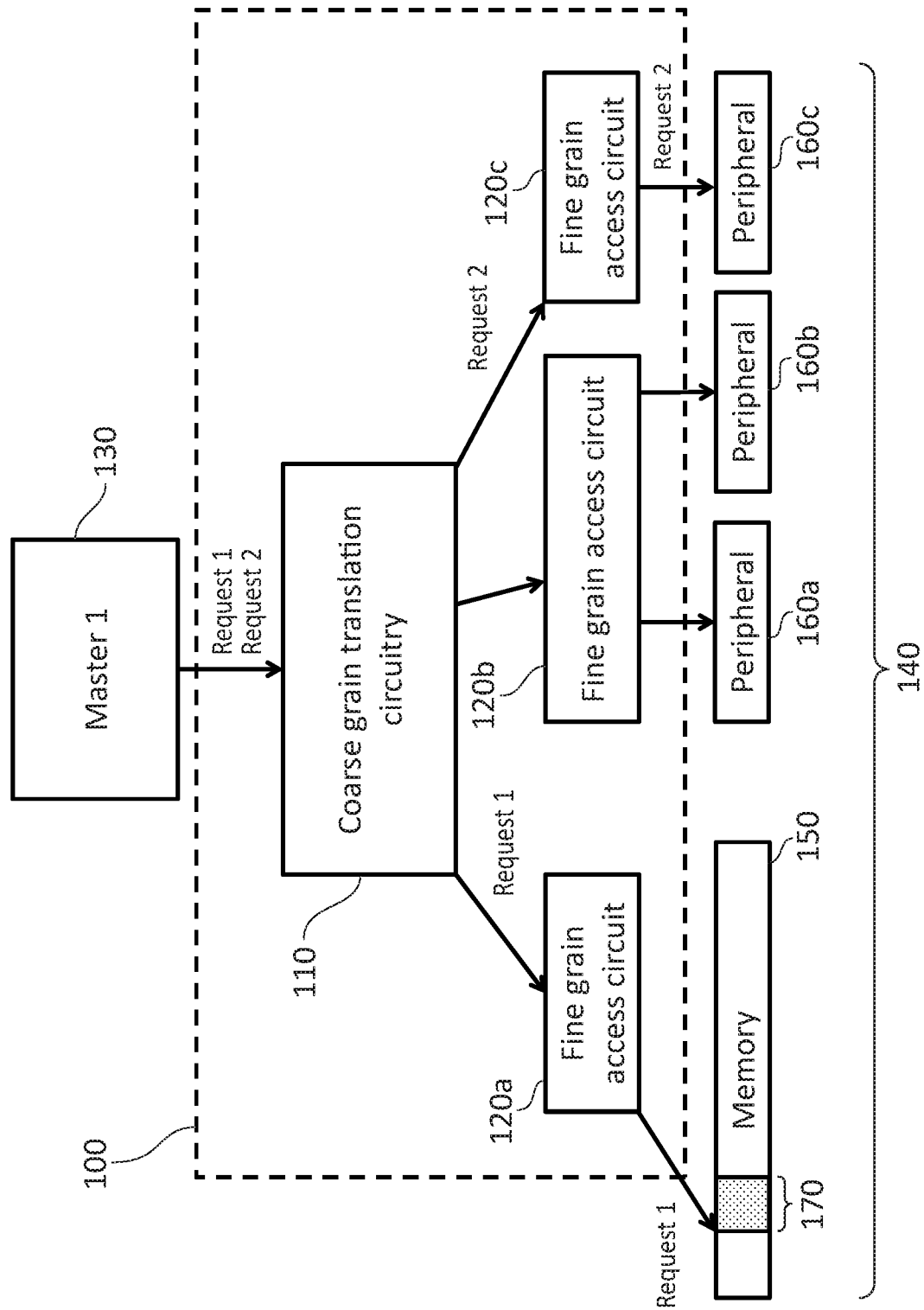
FIG. 1 illustrates a schematic of the apparatus in accordance with some examples.

FIG. 1 illustrates a schematic of the apparatus 100 in accordance with some examples. In this case, the apparatus 100 takes the form of an interconnect, which comprises coarse grain translation circuitry 110 (which is an example of coarse grain access circuitry) and 3 fine grain access circuits 120a, 120b, 120c. In this example, the master 130 issues one or more requests to the apparatus 100. These requests are received at the coarse grain translation circuitry 110. Each of the requests relate to a particular input address, which refers to an area of an input address space. Based on the input address, or part of the input address, the coarse grain translation circuitry 110 provides a reference to an area of an output address space 140. The output address space 140 defines a number of regions including a memory 150, and peripherals 160a, 160b, 160c. In this way, a request may be issued in order to access a part of the memory 150 or one of the peripherals 160a, 160b, 160c. The interconnect 100 forwards the request to one of the fine grain access circuits 120a, 120b, 120c based on the input address of the corresponding request. Here, the relevant fine grain access circuit 120a, 120b, 120c performs a further refinement such that it provides a reference to a sub-area in the output address space 140 in dependence on the input address. The sub-area is a sub-area of the area referred to by the coarse grain translation circuitry 110.

In the example shown in FIG. 1, request 1 is passed to coarse grain translation circuitry 110, which returns a reference to an area (memory 150). The request is then passed to fine grain access circuit 120a, which in turn refers to a sub-area 170 of the memory 150. It will be appreciated that the 'area' and the 'sub-area' are each different parts of an output address. Since the coarse grain translation circuitry 110 and the fine grain access circuit 120a each provides a separate part of the address used to access the sub-area 170 of the memory 150, the number of effective translations that are stored is equal to a multiplication of the number of entries stored at the coarse grain translation circuitry 110 and the number of translations stored in the fine grain access circuits 120a, 120b, 120c. As a consequence, and since none of the fine grain access circuits 120a, 120b, 120c defines the sub-areas outside their corresponding areas, the number of translations required can be reduced as compared to a system where any part of the address space 140 can be referred to by any translation circuit. For instance, in this example, the fine grain access circuit 120a is unable to provide a physical address that refers to a peripheral 160a. Hence, the physical address used to access the sub-area 170 is made up from a number of bits provided by the coarse grain translation circuitry 110 and a number of bits provided by the fine grain access circuit 120a. If the fine grain access circuit 120a contains five entries, and the coarse grain translation circuitry 110 contains two entries for which a request will be forwarded to the fine grain access circuit 120a, then only seven entries need to be stored even though this in practice provides 10 translations. Accordingly, it can be seen that the number of entries required can be reduced.

Note that in this example, the coarse grain circuitry and the fine grain circuits are translation and access circuits respectively. In practice, no translation is necessitated. The input address and output address could be the same and the access circuitry could simply determine the existence of a local entry to determine whether access is permitted. Hence, other embodiments may make use entirely of access circuitry or entirely of translation circuitry.

Figure 2:
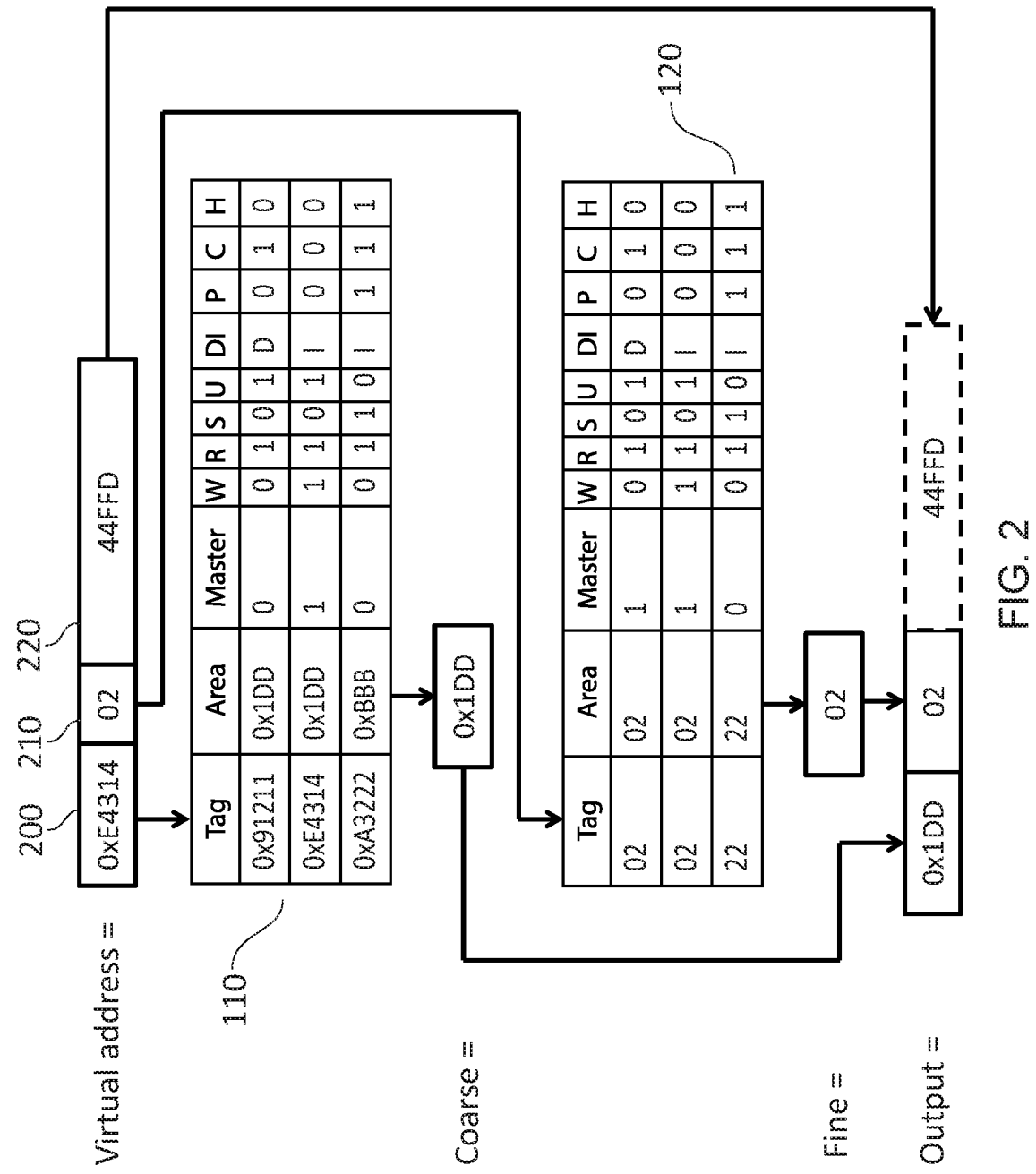
FIG. 2 shows a process of obtaining an output address from an input address in accordance with some examples.

FIG. 2 illustrates an example of generating the output address from an input address such as a virtual address. The virtual address can be considered as three different components—Tag0 200, Tag1 210, and an index 220. In this example, at the coarse grain translation circuitry 110, Tag0 is compared to entries in a local table to determine whether a translation can be performed. In this case, it is noted that there is an entry with the same Tag0 200 (0xE4314) for the corresponding master (1). The corresponding area for this entry is marked a 0x1DD. Based on the input address, the request including the virtual address is then forwarded to a fine grain access circuit 120. In this example, the fine grain access circuit does not provide translation. Hence, Tag1 is simply copied directly. In practice, the 'Area' column would not need to be present in access circuitry. However, for convenience, such a column has been provided for the fine grain access circuit in FIG. 2, to illustrate how a further translation could also be performed using Tag1. In any event, it is shown that there is a corresponding entry having the same Tag1 210 (02) with the corresponding master (1) and so access is permitted. The area from the coarse grain translation circuitry 110 is combined together with unmodified Tag1 and the index 220 from the virtual address. This in turn provides an output address. It will be noted that since the area output by the fine grain access circuit 120 is concatenated with the output from the coarse grain translation circuit 110, the fine grain access circuit 120 defines a sub area under the area defined by the coarse grain translation circuit 110.

In this example, no entries are stored for invalid entry at either the coarse grain translation circuit 110 or the fine grain access circuit 120. This improves the efficiency of each circuit, since fewer translations can be stored.

Each of the entries also comprises a number of permissions. These define particular access types with which the underlying area can be accessed. These include the flags W which indicates whether the area is writeable, R, which indicates whether the area is readable, S, which indicates whether secure access is permitted, U, which indicates whether non-secure access is permitted, DI, which indicates whether data access or instruction access is permitted, P, which indicates whether access must be privileged, C, which indicates whether the access is cacheable, and H which indicates whether the access is sharable, (e.g. whether a particular master has sole use of the data or not). It will be appreciated that each of these flags are merely examples and that they indicate the inverse permissions as well. The access request made by the master will contain one or more access types which indicate a degree to which access is desired. As part of the check performed by either the coarse grain translation circuitry 110 or the fine grain access circuitry 120, it is determined whether the associated permissions match the access type. If not, then access is not permitted. However, in some cases, as will be illustrated with reference to FIG. 4, it may be possible to change the access type to one that is permitted.

FIG. 3A illustrates an example in which the coarse grain translation circuitry 110 is faced with an access request for which no valid entry is present. This occurs when one of the tag, master, or permissions does not match any corresponding entry stored locally at the coarse grain translation circuitry 110. In this case, there is no entry having a tag matching 0xE4315 for a corresponding master 1. Consequently, the access is not permitted. This results in an error and/or interrupt being raised. A similar situation is shown with respect to FIG. 3B. In this example, an initial match is made at the coarse grain translation circuitry 110. In this example, an output is produced by the coarse grain translation circuitry 110 in the form of translated area 0x1DD. This then gets forwarded to a fine grain translation circuit 300. However, at that point, no corresponding entry can be located in the local table of the fine grain translation circuit 300. In particular, there is no entry having the tag 22 for master 1. Consequently, the access fails and an error and/or interrupt is raised.

It will be appreciated that in either of the examples of FIG. 3A or 3B, a similar situation will arise if the tag and master match, but the access type does not match the permissions or for instance if the request appears to originate from a master that cannot be found.

FIG. 4 illustrates an example in which access types can be changed. In this example each of master 0 and master 1 issue an access request to the interconnect 100. As shown, each of them uses a different virtual address. The access from master 0 is a secure read and the access from master 1 is a secure write. Within at least one of the coarse grain translation circuitry 110 and the fine grain access circuit 120 is a translation table 400 comprising one or more translations. These indicate, for particular tags and masters, how the access types are permitted to be translated. In this example, any translation is performed after access checks are made by either the coarse grain translation circuitry or the fine grain access circuitry 120. In other embodiments, this could be reversed. Here, there is a translation permitted from a secure read to a non-secure read for the access performed by master 0 and from a secure write to a non-secure write for the access performed by master 1. As a consequence, the access from master 0 is permitted provided there is an appropriate entry for either a secure read or a non-secure read. Similarly, the access from master 1 is permitted provided there is an entry for either a secure write or a non-secure write. In this case it is determined whether there is an appropriate entry that allows secure access and if so, the translation is performed] The process therefore searches for the relevant area in the table, performs permission checks, and then applies the relevant translation.

FIG. 5 illustrates an example of an embodiment in which a request for a new memory allocation is made by software running on a master or software running on a different master. In a first step, a master 130 requests a memory allocation of a new area. This request is issued to memory management circuitry 500. In response, the memory management circuitry 500 allocates memory for the new area. In particular, the request received from the master 130 will indicate an amount of memory that is desired by the master 130. Assuming that such resources exist, the memory management circuitry 500 will allocate an area of this size. Having allocated the memory for the new area, a page table entry is generated at a step 530. Then, at a step 540, the new page table entry is associated with the allocated memory. Accordingly, when provided with a relevant virtual address, a physical address corresponding with this newly allocated memory area will be provided by the page table entry. The new page table entry is provided to the access circuitry at a step 550. In this embodiment, the access circuitry is considered to be the coarse grain translation circuitry 110. However, in other embodiments, it could be one of the fine grain access circuits 120 instead or as well. Obviously, where multiple access circuits are used, multiple page table entries will have to be generated and associated at steps 530 and 540 correspondingly, the memory management circuitry 500 also provides the new area reference to the master 130. Accordingly, the master 130 is provided with the virtual address used to access the new area. Each of the steps 510 to 550 is performed before step 560, and step 560 is performed prior to the master 130 providing an access request for the new area of memory at step 570. In other words, prior to the access request being made, the access circuitry is populated with a new entry corresponding to that area of memory thereby obviating the need for a page walk to occur. This can improve the efficiency of the system as a consequence of reducing the need for the page walk to be performed, which can be time consuming By virtue of the coarse/fine grain access circuits being able to store a reduced number of entries, it is less likely that any newly created entry will be evicted prior to being needed at step 570. Accordingly, it is unlikely that a page walk will be required.

FIG. 6 illustrates an example embodiment in which a hierarchy of access circuits is provided. Up until this point, embodiments have considered a coarse grain access circuit (in the form of coarse grain translation circuit 110) and a fine grain access circuit 120. In the embodiment shown in FIG. 6, a third level of this hierarchy is provided in the form of a super-fine grain access circuits 600aa, 600ab, 600ac, 600ba, 600bb. One or more such circuits are provided for each fine grain access circuit 120. The super-fine grain access circuits 600 can be used to perform access control (and potentially translation) on a Tag2 of the virtual address (e.g. lower bits than Tag1 and higher bits than the index).

It will be appreciated, that this concept can be extended to a hierarchy of any size. The benefit of the number of effective translations achieved increases substantially as the height of the hierarchy increases.

FIG. 7 illustrates an example in accordance with some embodiments. In these examples, the apparatus 100 is shown as separating the interconnect 700 from the course circuitry 110, which is an example of coarse grain access circuitry in the form of a coarse grain translator and fine circuitry, which is an example of fine grain access circuitry in the form of a fine grain translator 300. Accordingly, it will be appreciated that the course circuitry 110 and the fine circuitry 300 may be provided outside of the interconnect 700. As before, fine circuitry 0 300a connects to a RAM 150, a fine circuitry 1 300b connects to a peripheral 0 160a, and a fine circuitry 2 300c connects to a peripheral 1 160b. In this example, the RAM is 512 kB, peripheral 0 is represented by 8 kB, and peripheral 1 is represented by 4 kB. Once again, the virtual address is made up from a Tag0 200, a Tag1 210, and an index 220. In this example, Tag0 is made up from the top 12 bits of the virtual address. The corresponding page table comprises a single valid entry which is relevant for the master 130. This provides a translation for the top 12 bits of the virtual address as represented by Tag0 200. Effectively, this therefore controls whether the master 130 is permitted to access the interconnect 700 based on the access request being made. Since this translation is the only translation that affects the top 12 bits, this enables the corresponding physical address to be located to anywhere within the entire 32 bit address space.

Based on the entirety of the input address, the interconnect 700 then forwards the input request to one of the fine circuitry 0 300a, the fine circuitry 1 300b, and the fine circuitry 2 300c. Note that it is not the value of Tag0 that necessarily determines which of the fine circuits 300 the request is forwarded to. However, as illustrated by the entry held at either the fine circuitry 0 300a, or the fine circuitry 2 300c, each of these fine circuits 300 further defines a sub area of the area defined by Tag0. In other words, the coarse circuitry 110 takes an Input Address (IA), and produces an Intermediate Output Address (IOA). In this embodiment, there are only two levels in the hierarchy and so further IOAs are not produced. However, in other embodiments, there could be multiple IOAs. The request is passed to one of the fine circuitry 300, which produces an Output Address (OA) by combining the output from the course circuitry 110, the translation provided by the only valid entry for the master 130 at the fine circuitry 300, and the index 220. In the case of fine circuity 1 300b and fine circuitry 2 300c, significantly fewer bits than provided by Tag1 210 are required. In particular, peripheral 0 is presented using 8 kB. If the page size (i.e. the size of the sub area) is 4 kB, then only two entries are present in fine circuitry 1 300b. The remaining bits of Tag1 are copied verbatim from the virtual address to the OA. In this embodiment, the OA is also a Physical Address (PA).

Note that in the table associated with fine circuitry 1 300b, there are no valid entries. In other words, the master 130 is unable to access peripheral 0, and no translation can be provided Also note that in this embodiment, invalid entries are stored in the fine circuitry 120 and the course circuitry 110. In other embodiments, invalid entries are not stored and if no valid entry is located, then it is automatically assumed that the access request is invalid.

FIG. 8 illustrates a flow chart 800 in accordance with some examples. At a step 810, a request is received from a master in order to access an input address. At a step 820, a reference to an area of an output address space is provided by coarse grain access circuitry. The reference is provided in dependence on the input address. At a step 830, the request is forwarded from the coarse grain access circuitry to a fine grain access circuit in dependence upon the input address. This could, for instance, be performed by an interconnect. Finally, at a step 840, a reference to a sub area of the area of the output address space is provided by fine grain access circuitry. The sub area depends on the input address.

FIG. 9 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 930, optionally running a host operating system 920, supporting the simulator program 910. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 930), some simulated embodiments may make use of the host hardware, where suitable.

The simulator program 910 may be stored on a computer-readable storage medium (which may be a non-transitory medium), and provides a program interface (instruction execution environment) to the target code 900 (which may include applications, operating systems and a hypervisor) which is the same as the application program interface of the hardware architecture being modelled by the simulator program 910. Thus, the program instructions of the target code 900, including the operation of the coarse grain translation circuitry and/or one or more of the fine grain access circuits described above, may be executed from within the instruction execution environment using the simulator program 910, so that a host computer 930 which does not actually have the hardware features of the apparatus 2 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus adapted to receive a request from a master to access an input address, the apparatus comprising:
   coarse grain access circuitry to store and provide a reference to an area of an output address space in dependence on the input address; and
   one or more fine grain access circuits, each to store and provide a reference to a sub-area in the area of the output address space in dependence on the input address, wherein
   the apparatus is adapted to forward the request from the coarse grain access circuitry to one of the one fine grain access circuits in dependence on the input address.

2. An apparatus according to claim 1, wherein
   in response to the coarse grain access circuitry lacking an entry corresponding with the input address, the coarse grain access circuitry is adapted to do at least one of the following: raise an error, and raise an interrupt.

3. An apparatus according to claim 1, wherein
   in response to the fine grain access circuits lacking an entry corresponding with the input address, the fine grain access circuitry is adapted to do at least one of the following: raise an error, and raise an interrupt.

4. An apparatus according to claim 1, wherein
   the master is one of a plurality of masters;
   the apparatus is adapted to receive the request from any of the plurality of masters; and
   each reference stored by the coarse grain access circuitry and each of the one or more fine grain access circuits is associated with one of the plurality of masters.

5. An apparatus according to claim 4, wherein
   the coarse grain access circuitry is adapted to provide the reference to the area of the output address space in further dependence on the master.

6. An apparatus according to claim 4, wherein
   each of the one or more fine grain access circuits is adapted to provide the reference to the sub-area in further dependence on the master.

7. An apparatus according to claim 4, wherein
   the coarse grain access circuitry is adapted to provide different references for at least a subset of the plurality of masters in respect of the same input address.

8. An apparatus according to claim 4, wherein
   one or more fine grain access circuits is adapted to provide different sub-areas for at least a subset of the plurality of masters in respect of the same input address.

9. An apparatus according to claim 1, wherein
   a size of the sub-area is at most a size of the area.

10. An apparatus according to claim 1, comprising
    allocation circuitry to generate a new entry, associate a new area of the output address space with the new entry, and provide the new entry to the coarse grain access circuitry before a request to access the new area is received.

11. An apparatus according to claim 1, comprising
allocation circuitry to generate a new entry, associate a new area of the output address space with the new entry, and provide the new entry to one of the one or more fine grain access circuits before a request to access the new area is received.

12. An apparatus according to claim 1, wherein
the input address is a virtual address or an intermediate physical address.

13. An apparatus according to claim 1, wherein
a size of the area is greater than 64 kB.

14. An apparatus according to claim 1, comprising:
a hierarchy of access circuits, comprising a plurality of n levels;
a first of the n levels comprising the coarse grain access circuitry;
a second of the n levels comprising the one or more fine grain access circuits, wherein
a size of the area referenced by circuitry at each level decreases as level increases.

15. An apparatus according to claim 1, wherein
the request comprises a requested access type;
at least one of the coarse grain access circuitry and the one or more fine grain access circuits is adapted to store the reference with one or more associated properties and to provide the reference in further dependence on the requested access type and the one or more associated properties.

16. An apparatus according to claim 15, wherein
the properties include one or more of: whether read access is permitted, whether write access is permitted, whether secure access is permitted, whether non-secure access is permitted, whether data access is permitted, whether instruction access is permitted, whether privileged access is permitted, whether unprivileged access is permitted, whether the access is cacheable, whether the access is uncacheable, whether the access is shareable, and whether the access is unsharable.

17. An apparatus according to claim 15, wherein
at least one of the coarse grain access circuitry and the fine grain access circuits modifies the requested access type in dependence on the requested access type and on one or more access translations.

18. An apparatus according to claim 1, wherein
at least one of the coarse grain access circuitry and fine grain access circuits is translation circuitry.

19. A method comprising:
receiving a request from a master to access an input address;
providing, at coarse grain access circuitry, a reference to an area of an output address space in dependence on the input address;
forwarding the request from the coarse grain access circuitry to a fine grain access circuit in dependence on the input address; and
providing, at the fine grain access circuitry, a reference to a sub-area in the area of the output address space in dependence on the input address.

20. A non-transitory, computer-readable storage medium storing computer program instructions, which when executed by one or more processors, controls a host data processing apparatus to:
receive a request from a master to access an input address;
store in coarse grain access program logic and provide from the coarse grain access program logic a reference to an area of an output address data structure in dependence on the input address;
store in fine grain access program logic and provide from the fine grain access program logic a reference to a sub-area in the area of the output address data structure in dependence on the input address; and
forward the request from the coarse grain access program logic to part of the fine grain access program logic in dependence on the input address.

* * * * *